(12) United States Patent
Kulkarni et al.

(10) Patent No.: US 7,483,903 B2
(45) Date of Patent: Jan. 27, 2009

(54) UNSUPERVISED LEARNING TOOL FOR FEATURE CORRECTION

(75) Inventors: Parashuram Kulkarni, Bangalore (IN); Binu Raj, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 233 days.

(21) Appl. No.: 11/253,023

(22) Filed: Oct. 17, 2005

(65) Prior Publication Data
US 2007/0043707 A1 Feb. 22, 2007

(51) Int. Cl.
*G06F 7/00* (2006.01)
*G06F 12/00* (2006.01)
*G06F 17/00* (2006.01)
*G06F 17/30* (2006.01)

(52) U.S. Cl. .................... 707/100; 707/200
(58) Field of Classification Search .............. 707/2, 707/3, 100, 1, 10, 200
See application file for complete search history.

(56) References Cited

U.S. PATENT DOCUMENTS

| | | | |
|---|---|---|---|
| 5,875,446 A * | 2/1999 | Brown et al. ............. | 707/3 |
| 2003/0115189 A1* | 6/2003 | Srinivasa et al. ............ | 707/3 |
| 2005/0097160 A1* | 5/2005 | Stob ........................ | 709/200 |
| 2006/0059173 A1* | 3/2006 | Hirsch et al. .............. | 707/100 |

OTHER PUBLICATIONS

Chang, Ahia-Hui, et al., "IEPAD: Information Extraction Based on Pattern Discovery," WWW10 '01, May 1-5, 2001, Hong Kong, ACM 1-58113-348-0, pp. 681-688.

Cohen, William W. et al., "A Structured Wrapper Induction System for Extracting Information Semi-Structured Documents," WhizBang! Labs, 7 pages.

Cohen, William W., et al., "A Flexible System for Wrapping Tables and Lists in HTML Documents," Carnegie-Mellon University Department of Computer Science, Sep. 19, 2003, Retrieved from the internet at <www.cs.cmu.edu/People/wcohen/postscript/ws-chap-2002.pdf>, pp. 1-30.

Doorenbos, Robert B., et al., "A Scalable Comparison-Shopping Agent for the World-Wide Web," Department of Computer Science and Engineering, University of Washington, Seattle, WA., 10 pages.

(Continued)

*Primary Examiner*—James K. Trujillo
*Assistant Examiner*—Nicholas E Allen
(74) *Attorney, Agent, or Firm*—Hickman Palermo Truong & Becker LLP

(57) ABSTRACT

Techniques for correcting miscategorized features excerpted from web pages are provided. For each of several categories and several pages on a particular web site, a separate feature may be excerpted from that page and associated with that page in relation to that category. Often, many of the "high confidence" features that have been associated with the same category are found to be associated with similar characteristics regardless of the pages from which those features were excerpted. Thus, a set of category characteristics, which are often found associated with the "high confidence" features in a particular category, may be determined. For each page, a candidate feature that is associated with the set of category characteristics may be identified in that page. If, in relation to the particular category, a feature other than the candidate feature is associated with that page, then that other feature may be replaced by the candidate feature.

16 Claims, 5 Drawing Sheets

OTHER PUBLICATIONS

Eliassi-Rad, Tina, et al., "Using a Trained Text Classifier to Extract Information," Computer-Sciences Department, University of Wisconsin, located on the internet at: <http://www.cs.wisc.edu/~eliassi/tech_report.pdf#search='Using%20a%20Trained%20Text%20Classifier%20to%20Extract%20Information'>, pp. 1-4.

Embley, D.W., et al., "Record-Boundary Discovery in Web Documents," Department of Computer Science, Brigham Young University, Dec. 1998, 12 pages.

Hsu, Chun-Nan, et al., "Generating Finite-State Transducers for Semi-Structured Data Extraction from the Web," Information Systems, 1998, vol. 23, No. 8, pp. 521-538.

Kukarni, Parashuram, "Rebiex: Record Boundary Indentification and Extraction through Pattern Mining," Yahoo Research and Development Centre, 15 pages.

Kushmerick, Nicholas, et al., "Information Extraction by Text Classification," Smart Media Institute, Computer Science Department, University College Dublin, located on the internet at <http://www.cs.ucd.ie/staff/nick/home/research/dowload/kushmerick-atem2001.pdf#search='Information%20Extraction%20by%20Text%20Classification'>, pp. 1-7.

Kushmerick, Nicholas, et al., "Wrapper induction: Efficiency and expressiveness," Artificial Intelligence 118 (2000), pp. 15-68.

Lerman, Kristina, et al., "Automatic Data Extraction from Lists and Tables in Web Sources," Information Science Institute, University of California, located on the internet at: <http://www.isi.edu/~lerman/papers/lerman-atem2001.pdf#search='Automatic%20Data%20Extraction%20from%20Lists%20and%20Tables%20in%20Web%20Sources>, 'pp. 1-6.

Muslea, Ion, et al., "A Hierarchical Approach to Wrapper Induction," University of Southern California, <http://www.ai.sri.com/~muslea/PS/hwi_aa99.pdf#search='A%20Hierarchical%20Approach%20to%20Wrapper%20Induction'>, pp. 1-8.

Nigam, Kamal, et al., "Text Classification from Labeled and Unlabeled Documents Using EM," Machine Learning, located on the internet at: <http://www.kamalnigam.com/papers/emcat-mlj99.pdf#search='Text%20Classification&20from%20Labeled%20and%20Unlabeled%20Documents%20Using%20EM'>, pp. 1-34.

"String Matching Algorithms," Vilnius University, Department of Computer Science, Located on the internet at <www.mif.vu.lt/cs2/courses/ds99fa6.pdf>, pp. 1-25.

Office action in U.S. Appl. No. 11/192,620, mailed May 28, 2008.

* cited by examiner

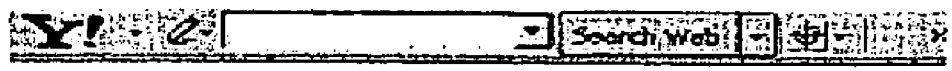

Software Engineer

Location:   Sunnyvale, CA, USA

Reponsibilities of this job include ......The candidate should have strong communication skills, ...... good in c, c++ ......

Email resume to :   resumes@yahoo.com

System Administrator

Location:   Bangalore, IND

Reponsibilities of this job include ......The candidate should have strong communication skills, ..... good knowledge of UNIX .....

Email resume to :   resumes@yahoo.com

Project Manager

Location:   Mountain View, CA, USA

Reponsibilities of this job include ......The candidate should have strong managerial skills, ...... good knowledge of ......

Email resume to :   resumes@yahoo.com

UNSUPERVISED LEARNING TOOL FOR FEATURE CORRECTION

CLAIM OF PRIORITY TO APPLICATION FILED IN FOREIGN COUNTRY

The present application claims priority under 35 USC § 119(a) to an application for patent filed in India on Aug. 17, 2005, the title of that application being "UNSUPERVISED LEARNING TOOL FOR FEATURE CORRECTION," and the application number of that application being 753/KOL/05.

FIELD OF THE INVENTION

The present invention relates to data processing and, more specifically, to automatically validating and correcting the feature extraction results in search indices by identifying recurrent patterns in HTML/text documents.

BACKGROUND

Web sites present information on various topics in various formats. A great amount of effort is often required for a user to manually locate and extract useful data from the web sites. Therefore, there is a great need for value-added services that integrate information from multiple sources. For example, such services include customizable web information gathering robots/crawlers, comparison-shopping agents, meta-search engines and news bots, etc.

To facilitate the development of these information integration systems, good tools are needed for information gathering and extraction. In situations where data has been collected from different web sites, a conventional approach for extracting data from various web pages uses programs called "wrappers" or "extractors" to extract or excerpt data items, or "features," from the contents of the web pages.

For example, an extractor might attempt to categorize different data items that occur within a particular web page. If the web page comprises an advertisement for an employment opportunity, for example, then the extractor might attempt to locate, within the web page, separate data items that fit into "job title" and "job location" categories. The extractor might attempt to categorize data items on multiple separate web pages in this manner. When the extractor locates a data item that the extractor deems to fit a particular category, the extractor may insert that data item into a search index, and establish an association between that data item and the category that the data item is deemed to fit. When a user later queries a search engine, the search engine may consult the search index to find search results in which the user may be interested. The accuracy and completeness of the contents of the search index strongly influences the relevance and value of the results.

For a particular web page and a particular category, the extractor might or might not be able to locate, on that page, a data item that fits that category. If the criteria used to identify a data item that fits a particular category are not well adapted to the construction of the page, then the extractor might mistakenly determine that a data item other than the "correct" data item fits the category. For example, the extractor might mistakenly determine that the "job location" data in a web page (rather than the actual "job title" data in that web page) fits into the "job title" category.

Based on how many of the criteria that the data item selected for a category satisfies, the extractor might assign, to the selected data item, an indication of how likely it is that the data item actually was the "correct" data item on the page—how likely it is that the data item actually did fit the category. This indication is commonly called a "confidence measure." Data items that are very likely to be the "correct" data items may be associated with relatively high confidence measures, while data items that are less likely to be the "correct" data items may be associated with lower confidence measures. If the confidence measure for a particular data item is lower than a certain threshold, then the extractor might refrain from inserting the data item into the search index at all.

After an extractor has automatically populated the search index, the search index may contain some incorrect entries, and may omit some correct entries. One approach for revising the search index involves employing a human being to look through the extracted data items manually, determine which data items have relatively low confidence measures, read the pages from which the low-confidence data items were excerpted, and determine whether any data items in those pages actually do fit the categories at issue. Although human beings are consistent and accurate in some cases, they usually operate slowly, and they can cost a considerable amount of money to train and maintain. Some human beings are less consistent and accurate than others, especially after they have been working uninterrupted for long periods of time. Mistakes happen.

Other approaches for revising the search index rely on the web pages being formatted in a known way, and, as a result, are inapplicable if the web pages are not formatted in that known way or if the structure of the web pages deviates over time from that known way. For example, some approaches might require the web pages to be HTML documents that conform to a specified scheme. These approaches fail when applied to documents that are not in HTML or which depart from the scheme even to a minor extent, sometimes due to changes in the documents after the extraction process has occurred.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is an illustration of a sample web page from which data items might be excerpted and categorized, according to an embodiment of the invention.

DETAILED DESCRIPTION

Figure 1:
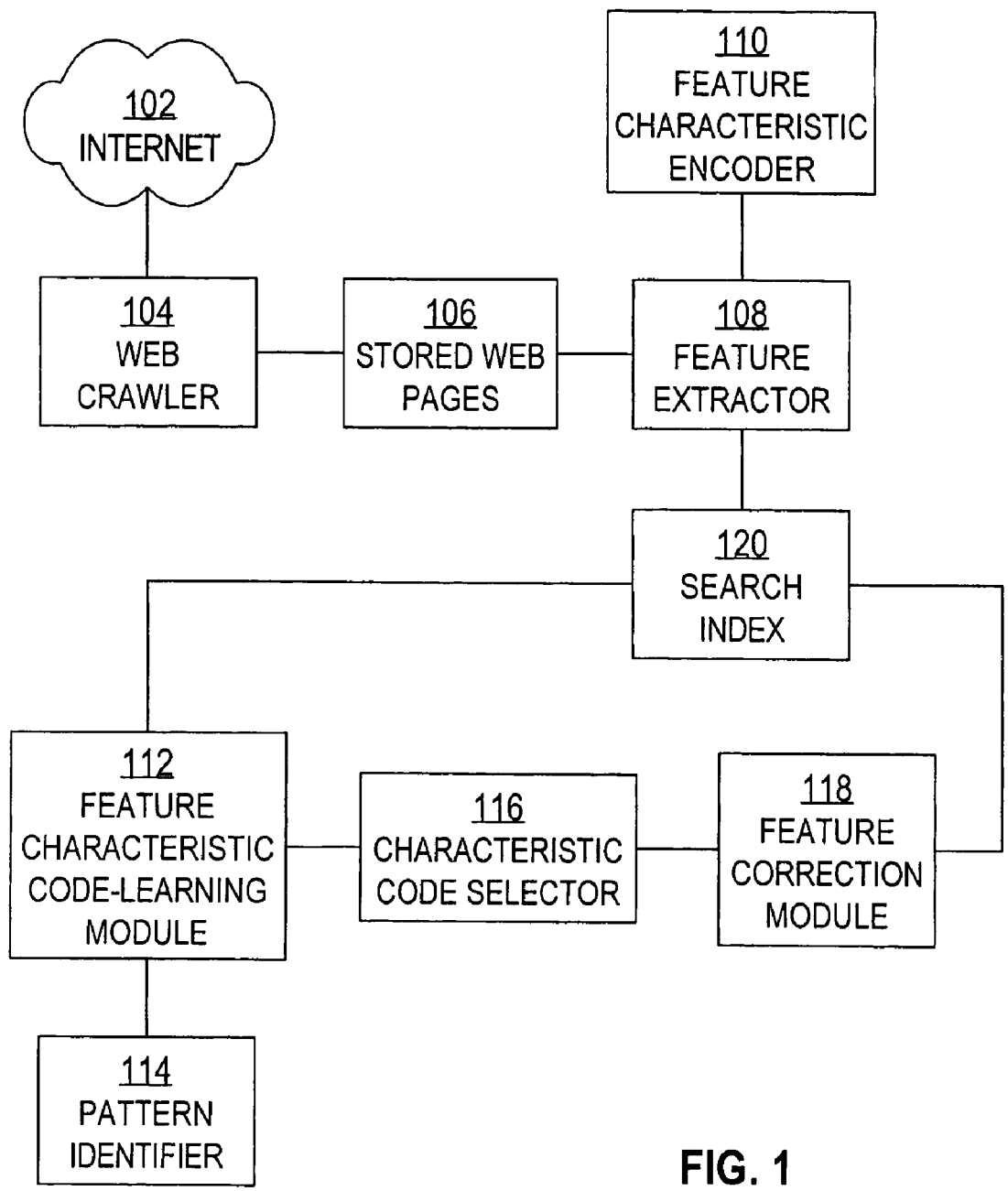
FIG. 1 is a block diagram illustrating a high-level functional view of the architecture of an example system that employs techniques described herein in order to revise a search index, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to one embodiment of the invention, it is assumed that an extractor has deemed certain data items (or "features") to be "high confidence measure" data items. High confidence measure data items are data items that are considered to likely (although not certainly) have been categorized correctly. For example, assume that data items X, Y and Z have been categorized into category Q. The confidence measures that data items X, Y and Z belong to category Q may be 90%, 75% and 25%, respectively. Under these circumstances, data item X and Y may be considered to be high confidence measure data items for category Q.

In one embodiment of the invention, a set of "category characteristics" is established for each category of a plurality of categories. For any particular category, the set of category characteristics is established based on characteristics that are associated with the "high confidence measure" data items in the particular category. For example, a set of category characteristics for category Q may be established based on the characteristics that data items X and Y have in common. The set of category characteristics for any given category comprises characteristics that are shared by many, if not all, of the "high confidence measure" data items in that category.

For example, consider a scenario in which data items are excerpted from web pages, categorized, and placed in a search index (to index the web pages from which they were excerpted) if their confidence measures are sufficiently high. For each data item that (a) has been associated with a particular category and (b) is in the search index, a set of characteristics that are associated with that data item may be identified within a web page from which the extractor excerpted the data item. The set of characteristics that are identified for a particular data item are referred to herein as the data item's "data item characteristics".

For example, in a "job title" category, there might be three high confidence data items: "Software Engineer," "Lead Developer," and "QA Tester." Each of these data items might be associated with the following characteristics: "font size 3" and "font color blue."

For each such data item, its data item characteristics may be inserted into a set of candidate characteristics. A set of characteristics may be selected, from the set of candidate characteristics, to be the category characteristics for a particular category. The set of category characteristics may be selected, for example, based on the candidate characteristics that were identified most often in association with the high confidence measure data items. For example, if the set of characteristics "font size 3" and "font color blue" occur more often in association with "Software Engineer," "Lead Developer," and "QA Tester" than any other set of characteristics, then that set may be selected as the set of category characteristics for the "job title" category.

In one embodiment of the invention, once a set of category characteristics has been established, the category characteristics are used to identify additional data items to index. Specifically, candidate data items that are associated with the category characteristics are identified within web pages of a web site. If the candidate data item is not already contained in the search index, then the candidate data item may be inserted into the search index.

For example, assuming that the category characteristics for the "job title" category are "font size 3" and "font color blue," then, for each page on the web site for which the category characteristics were identified, a candidate data item that is associated with both characteristics "font size 3" and "font color blue" may be located. If, on a particular page, a data item "RN 105" is associated with both of these characteristics, then "RN 105" may be inserted into the search index.

If, for a particular web page and category, the search index contains a data item other than the candidate data item identified for that web page and category (e.g., because the extractor selected the wrong data item in that web page for that category), then the data item in the search index may be replaced with the candidate data item. Alternatively, if, for a particular web page and category, the search index contains no data item for that web page and category (e.g., because the extractor did not locate any "high confidence measure" data item for that category in that web page), then the candidate data item may be inserted into the search index in association with that web page and category. Thus, the search index may be revised and made more complete and accurate.

According to one embodiment of the invention, the sets of characteristics are identified in a "fuzzy" manner that considers text content and position in addition to or instead of HTML formatting, so that a set of characteristics corresponding to a particular category of data item can be identified even if the data items in the particular category vary from each other to some extent. According to one embodiment of the invention, all of the above is performed without any human intervention, and without any training data, thus contributing to the scalability and economic feasibility of the foregoing technique. According to one embodiment of the invention, web pages are encoded in a manner so that similar types of data items are represented by similar symbols. Repeating patterns, which denote common characteristics, can be determined by locating repeating symbol sequences among the web pages.

Example System Architecture

FIG. 1 is a block diagram illustrating a high-level functional view of the architecture of an example system 100 that employs techniques described herein in order to revise a search index, according to an embodiment of the invention. System 100 comprises the Internet 102, a web crawler 104, stored web pages 106, a feature extractor 108, a feature characteristic encoder 110, a feature characteristic code-learning module 112, a pattern identifier 114, a characteristic code selector 116, a feature correction module 118, and a search index 120. Several of the elements of system 100 may be implemented as separate programmatic modules that are executable on a computer, for example.

Web crawler 104 fetches web pages from Internet 102. From each web page fetched, web crawler 104 identifies, on that web page, links to other web pages, and visits and fetches those other web pages as well. Web crawler 104 continuously performs these actions in a recursive manner. Web crawler 104 stores, in stored web pages 106, each web page that web crawler 104 visits.

Stored web pages 106, also called the "web crawler store," are a collection of web pages that web crawler 104 has fetched and saved to a persistent storage device. The web crawler store may be implemented as a database, for example. In addition to the web pages themselves, the web crawler store may contain metadata that indicates the order in which any "ancestor" pages were visited (i.e. those pages whose links web crawler 104 followed to arrive at the subject web pages), and/or the Uniform Resource Locators (URLs) of those "ancestor" pages. The metadata also may comprise HTTP POST data that web crawler 104 submitted in order to fetch the subject web pages. The metadata also may comprise the time and date that web crawler 104 fetched or downloaded the subject web pages.

Feature extractor 108 reads information that is contained in stored web pages 106. Generally speaking, feature extractor 108 converts unstructured data that is present in the web pages into useful structured information. For example, if stored web pages 106 contain advertisements for employment opportunities, feature extractor 108 may determine which parts of the web pages correspond to job titles, job locations, experience required, etc. In other words, feature extractor 108 categorizes, into specified categories, data items that are represented within stored web pages 106. The categorized data items may be used to index the web pages from which they came. Feature extractor 108 may use feature characteristic encoder 110 to help categorize the data items in a web page.

In one embodiment of the invention, feature characteristic encoder 110 receives a web page that comprises one or more distinct data items. Each data item may comprise one or more words and may be associated with one or more formatting tags, for example. Feature characteristics encoder 110 encodes the web page into a sequence of symbols. Each symbol represents a type of web page element, such as a particular type of HTML tag, and web page elements of the same type are represented by the same symbol. Feature characteristic encoder 110 encodes recognized web page elements based on the contents of those data items.

Additionally, in one embodiment of the invention, feature characteristic encoder 110 encodes recognized web page elements based on the positions of those web page elements within the web pages. For example, feature characteristic encoder 110 may logically divide a web page into "X" equally sized parts. Into the encoded version of each data item in the web page, feature characteristic encoder 110 may insert a value or symbol that indicates in which of the "X" parts the web page element was located.

For example, if a web page contained the expression, "<h1><b><font size=3 color=BB4455>Lead Developer</font></b></h>" in the first of "X" parts of the web pages, then feature characteristic encoder 110 might encode the expression as "HB3J1," where "H" corresponds to the "<h1>" tag, "B" corresponds to the "<b>" tag, "3" corresponds to the "size=3" declaration in the "<font>" tag, "J" corresponds to the "color=BB4455" declaration in the "<font>" tag, and "1" corresponds to the expression's position in the web page. More specific information on how feature characteristic encoder 110 may encode web pages and their component web page elements is described below.

Search index 120 contains multiple entries, and may be implemented as a database. In one embodiment of the invention, each entry indicates an association between a web page and a categorized data item that was extracted from that web page. In one embodiment of the invention, each entry also indicates the encoded version of that entry's corresponding data item. Each entry also may indicate the category to which the data item is deemed to fit, and a confidence measure (e.g., a number between 1 and 100) that indicates the degree of certainty that the data item actually does fit that category. The information contained in search index 120 may be used to construct results for a search query executed by a search engine. Separate search indices may be maintained for separate web sites. Inasmuch as the subject matter with which different web sites are concerned may differ, the categories of data items within the corresponding search indices may differ also.

Feature characteristic code-learning module 112 generally identifies category characteristics (characteristics that are often associated with "high confidence measure" data items that have been deemed to belong to the same category). It is assumed that data items that an extractor has deemed to be "high confidence measure" data items likely (although not certainly) have been categorized correctly. According to one embodiment of the invention, a data item is determined to be a "high confidence measure" data item if the confidence measure associated with that data item exceeds a specified threshold.

For example, feature characteristic code-learning module 112 might determine, for all data items in search index 120 that have been associated with the "job title" category (possibly incorrectly), which of those data items are "high confidence measure" data items. In one embodiment of the invention, search index 120 only contains "high confidence measure" data items; "low confidence measure" data items are omitted from search index 120 in such an embodiment of the invention.

Continuing the example, feature characteristic code-learning module 112 then might determine which characteristics are shared by at least a specified percentage (e.g., 80%) of the "high confidence measure" data items in the "job title" category. In determining which characteristics are shared, feature characteristic code-learning module 112 may compare the symbols that are present in the encoded versions of those data items. Symbols that are present in at least a specified percentage of the encoded versions are considered, in one embodiment of the invention, to represent a category characteristic.

Because data items contained in web pages from different web sites may have different category characteristics, even if those data items are in similar categories, in one embodiment of the invention, feature characteristics code-learning module 112 does not compare web page information from different web site domains (e.g., the part of the URL that comes before ".com") when determining the category characteristics for a particular category of data item. The category characteristics are determined on a per-web site, per-category basis.

For example, if the encoded versions of the "high confidence measure" data items for the "job title" category for a particular web site were "HBI5," "HBI5," "HB5," "ABC," "HB5," "HBI5," "XYZ," "HB5," and "HBI5," then feature characteristics code-learning module 112 might determine that the category characteristics for the particular web site's "job title" category are the characteristics corresponding to the symbols "H," "B," and "5," because these symbols occur most often among the encoded versions.

When all of the symbols contained in the encoded versions of a particular category's "high confidence measure" data items are concatenated together into a string, the symbols contained in the string will likely contain repetitive patterns. Category characteristics may be identified by identifying the repetitive patterns. Some of the patterns might not repeat in an exact manner, however. In order to properly identify category characteristics in a non-exact manner, pattern identifier 114 receives a sequence of symbols and identifies repeating symbol subsequences in a "fuzzy" manner.

Pattern identifier 114 generally does this by replacing multiple consecutive occurrences of each subsequence with a single occurrence of that subsequence and then removing non-repeating symbols that occur between repeating sequences. Pattern identifier 114 may repeat this process multiple times in order to refine the overall sequence. Each time, pattern identifier 114 may increase the size of the subsequences that are considered for replacement. By removing such non-repeating symbols, pattern identifier 114 accounts for minor inconsistencies between pages. One example of pattern identifier 114 is disclosed in U.S. patent application Ser. No. 11/192,620, titled "RECORD BOUNDARY IDENTIFICATION AND EXTRACTION THROUGH PATTERN MINING," and filed on Jul. 28, 2005. The entire contents of that application are incorporated by reference for all purposes as though fully and originally disclosed herein.

In some cases, pattern identifier 114 may identify multiple different sets of category characteristics for a particular web site and data item category. Referring to the example discussed above, pattern identifier might find all of the following repeating patterns: "HBI5," "HB5," "HB," "H," "B," "5," and "I." In such cases, characteristic code selector 116 receives the multiple sets and, based on specified criteria, selects one of the sets to be the representative set of category characteristics for that web site and data item category. For example, characteristics code selector 116 may choose a set of characteristics based on how many times that set occurs within the web pages of the web site, the proportion of each web pages to which the set corresponds (the "coverage" of the set), and how many symbols are contained in the set.

Once a representative set of category characteristics for a particular web site and data item category has been selected, feature correction module 118 may use the representative set to revise the entries in search index 120. In one embodiment of the invention, for each page on the web site, feature correction module 118 locates, on that web page, a data item that is associated with the representative set of category characteristics. For example, this may be accomplished by encoding the web page as described above with reference to feature characteristics encoder 110, searching the encoded version of the web page for a symbol sequence that the representative set of category characteristics represents, and, after finding such a symbol sequence in the web page, determining which part of the unencoded version of the web page—which "candidate" data item—corresponds to the symbol sequence found.

In one embodiment of the invention, if feature correction module 118 finds, on a web page, a "candidate" data item that is associated with the representative shared set of characteristics, then feature correction module 118 determines whether there is an association, in search index 120, between the web page and a data item that was deemed to fit the category at issue. If feature correction module 118 finds no such association (e.g., because no "high confidence measure" data item for the category was ever found in the web page), then feature correction module 118 may establish a new association between the web page and the "candidate" data item, and insert the new association into search index 120.

Alternatively, in one embodiment of the invention, if feature correction module 118 finds, in search index 120, an association between the web page and a data item that was deemed to fit the category at issue (i.e., the category to which the "candidate" data item belongs), then feature correction module 118 determines whether the data item associated with the web page is the same as the "candidate" data item. In one embodiment of the invention, if the data item associated with the web page differs from the "candidate" data item (e.g., because the wrong data item was originally associated with the category at issue), then feature correction module 118 removes the existing association between the web page and the data item from search index 120, and replaces that association with an association between the web page and the "candidate" data item. Thus, the entries in search index 120 are corrected.

Feature Characteristic Encoder

In one embodiment of the invention, feature characteristic encoder 110 comprises a visual tag encoder. The visual tag encoder encodes portions of a web page that are enclosed by HTML tags that affect the visual appearance of the enclosed portion. The visual tag encoder encodes these portions by replacing the portions with symbols that correspond to the enclosing tags.

Additionally, as is discussed above, feature characteristic encoder 110 also may encode an expression in a manner that is based on that expression's position in the web page. For each expression, feature characteristic encoder 110 may determine in which of "X" similarly sized parts of the web page the expression occurs, and include, in the encoded version of the expression, the identity of that part.

Visual Tag Encoding

As is discussed above, in one embodiment of the invention, a visual tag encoder encodes portions of a web page that are enclosed by HTML tags that affect the visual appearance of the enclosed portion. Since HTML tags are the basic components for data presentation, and since the text string between tags are exactly what a user sees in his browser, the text string between two tags, as well as the tags themselves, may be regarded as one unit. Some repeating patterns are realized by the repetition of visual characteristics of the text, which are governed by the HTML tags responsible for visual appearance of the text.

According to one embodiment of the invention, an HTML translation technique is used to encode portions of an HTML document. As a result of the HTML translation technique, any HTML tags that are responsible for the visual appearance of a text string are translated into one or more symbols that represent the HTML tags. In one embodiment of the invention, tags responsible for alignment and non-visual formatting are ignored since these tags do not contribute visual repetitiveness of text to the human eye.

According to one embodiment of the invention, for each tag in an HTML document, it is determined whether the tag is one of a specified set of tags that affect the visual appearance of text. Such tags may include tags that indicate that text is to be in a particular font, in a particular size, in a particular color, bolded, italicized, and/or underlined. In one embodiment of the invention, the specified set of tags includes the following tags: <H1> through <Hn>, <b>, <u>, <i>, <a>, and <strong>. In one embodiment of the invention, the specified set of tags excludes the following tags: <table>, <tr>, and <td>.

If the tag is included in the specified set of tags, then the tag's corresponding closing tag is removed from the document, the tag itself is replaced with a symbol that corresponds to the tag, and the text that was enclosed between the tags is enclosed between "<" and ">" characters instead. For example, using the technique described above, the expressions "<H2>Software Engineer</H2>," "<H2>System Administrator</H2>," and "<H2>Project Manager</H2>"

may be replaced with the symbol/string pairs "H<Software Engineer>," "H<System Administrator>," and "H<Project Manager>," respectively.

Alternatively, if a tag is not included in the specified set of tags, then the tag and its corresponding closing tag, if any, are removed from the document. However, text occurring between such tags is still considered to be a distinct web page element. The text that was enclosed between the tags is still enclosed between "<" and ">" characters.

In one embodiment of the invention, different tags are replaced with different symbols. For example, the "<H2>" tag may be replaced with symbol "H," the "<b>" tag may be replaced with symbol "B," and the "<a>" tag may be replaced with symbol "A." However, in one embodiment of the invention, different tags that produce approximately the same visual effect may be replaced by the same symbol. For example, tags "<H1>" through "<Hn>," "<b>," and "<strong>" all may be replaced with the same symbol "B."

For example, prior to the application of the visual tag encoding technique described above, the HTML source for the web page shown in FIG. 2 is as follows:

<Table>
   <tr><td><H2>Software Engineer</H2></td>td></tr>
   <tr><td>td><b>Location:</b></td></td><td>Sunnyvale, Calif., USA </td></tr>
   <tr><td>Responsibilities of this job include . . . The candidate should have strong communication skills, . . . good in c, c++ . . . </td></tr>
   <tr><td><b>Email resume to:</b></td><td>
     <a href="mailto:resumes@yahoo.com">resumes@yahoo.com</a>
   </td></tr></table>

<Table>
   <tr><td><H2>System Administrator</H2></td></tr>
   <tr><td><b>Location:</b></td><td>Bangalore, Ind.</td></tr>
   <tr><td>Responsibilities of this job include . . . The candidate should have strong communication skills, . . . good knowledge of UNIX . . . </td></tr>
   <tr><td><b>Email resume to: </b></td><td>
     <a href="mailto:resumes@yahoo.com">resumes@yahoo.com</a>
   </td></tr></table>

Table>
   <tr><td><H2>Project Manager</H2></td></tr>
   <tr><td><b>Location: </b></td><td>Mountain View, Calif., USA</td></tr>
   <tr><td>Responsibilities of this job include . . . The candidate should have strong managerial skills, . . . good knowledge of . . . </td></tr>
   <tr><td><b>Email resume to:</b></td><td>
     <a href="mailto:resumes@yahoo.com">resumes@yahoo.com</a>
   </td></tr></table>

After the application of the visual tag encoding technique to the foregoing HTML source, the resulting partially encoded document is as follows:

H<Software Engineer>B<Location:><Sunnyvale, Calif., USA><Responsibilities of this job include . . . . The candidate should have strong communication skills, . . . good in c, c++ . . . >B<Email resume to:>A<resumes@yahoo.com>H<System Administrator>B<Location:><Bangalore, Ind.><Responsibilities of this job include . . . . The candidate should have strong communication skills, . . . good knowledge of UNIX . . . >B<Email resume to:>A<resumes@yahoo.com>H<Project Manager>B<Location:><Mountain View, Calif., USA><Responsibilities of this job include . . . . The candidate should have strong managerial skills, good knowledge of . . . >B<Email resume to:>A<resumes@yahoo.com>

In the above partially encoded document, the "<H2>," "<b>," and "<a>" tags in the original document have been replaced with "H," "B," and "A," respectively.

Fuzzy Pattern Identification

Figure 3:
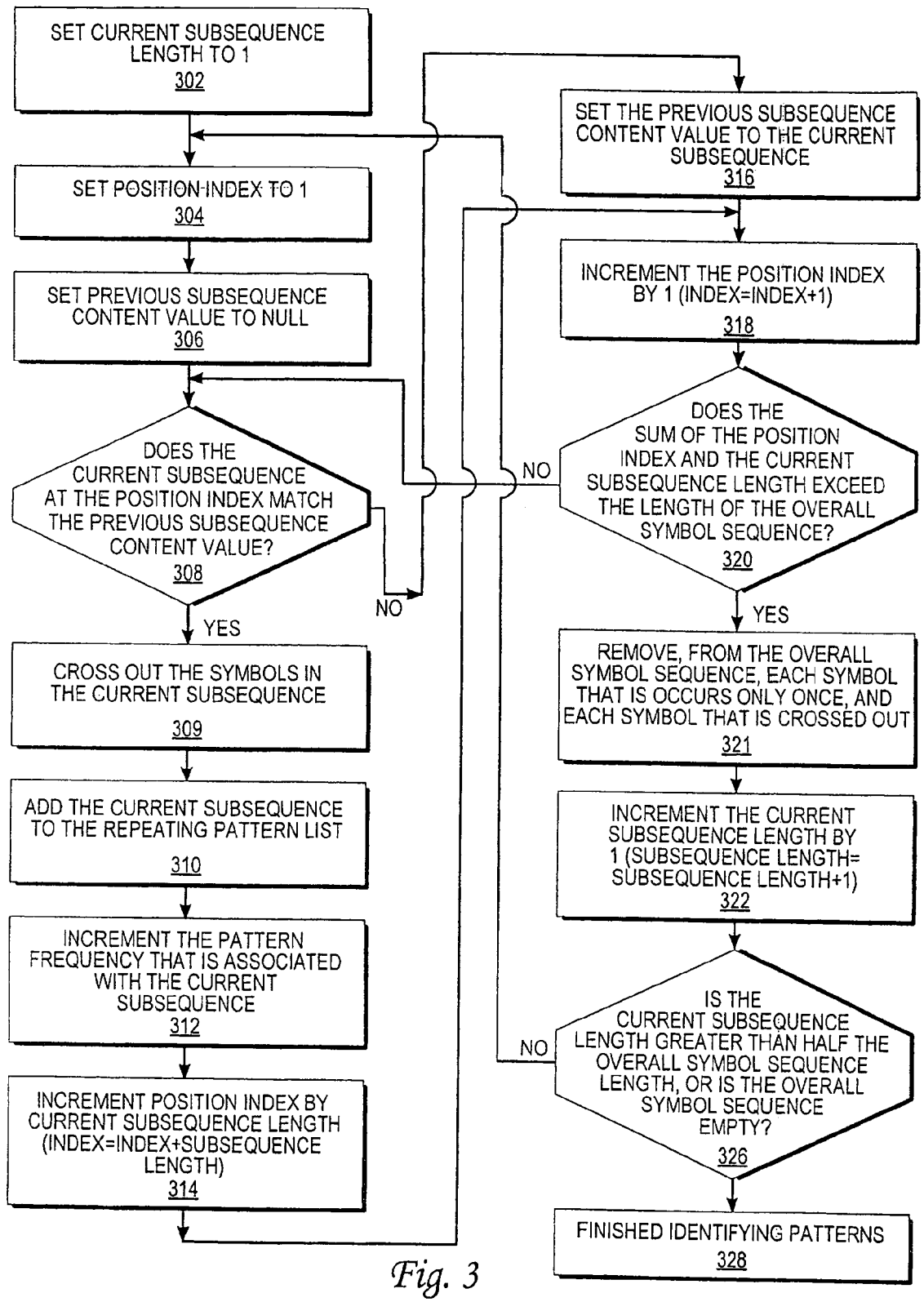
FIG. 3 is a flow diagram illustrating a technique for identifying patterns in a fuzzy manner, according to an embodiment of the invention.

In one embodiment of the invention, as is discussed above, pattern identifier 114 receives a sequence of symbols, such as a concatenation of all of the encoded versions of data items in search index 120 that correspond to a particular category and web site, and, in a fuzzy manner, identifies repeating symbol subsequences that occur within that sequence. FIG. 3 is a flow diagram illustrating a technique for identifying patterns in a fuzzy manner, according to an embodiment of the invention. For example, pattern identifier 114 may perform such a technique.

In block 302, a current subsequence length is set to equal "1." This is the initial size of repeating symbol subsequences that the pattern identifier 114 looks for in the overall symbol sequence. With each pass of the pattern identifying technique, the pattern identifier 114 looks for larger subsequences.

In block 304, a position index is set to equal "1." This is the initial position in the overall symbol sequence at which the pattern identifier 114 looks for repeating symbol subsequences. The first occurring symbol in the overall symbol sequence is at position "1."

In block 306, a previous subsequence content value is set to "null." The previous subsequence content value is used to store the subsequence that ends immediately before the position index in the overall symbol sequence. Since there is no subsequence that occurs prior to the beginning of the overall symbol sequence, the previous subsequence content value is initially set to "null."

In block 308, it is determined whether the current subsequence that begins at the position index in the overall symbol sequence matches the previous subsequence content value. If the current subsequence matches the previous subsequence, then control passes to block 309. Otherwise, control passes to block 316.

In block 309, the symbols in the current subsequence are "crossed out" in at the corresponding positions in the overall symbol sequence. Control passes to block 310.

In block 310, the current subsequence that begins at the position index in the overall symbol sequence is added to a repeating pattern list, if the current subsequence is not already in the repeating pattern list. Control passes to block 312.

In block 312, a pattern frequency that is associated with the current subsequence in the repeating pattern list is incremented. For each subsequence in the repeating pattern list, there is a corresponding pattern frequency that indicates how many times that subsequence occurs in the overall symbol sequence. This information is useful when selecting a subsequence to represent a set of category characteristics, as is described below. Control passes to block 314.

In block 314, the position index is incremented by the by the current subsequence length. Control passes to block 316.

In block 316, the previous subsequence content value is set to the value of the current subsequence that occurs at the position index in the overall symbol sequence. Thus, the previous subsequence becomes the current subsequence before the position index is incremented. Control passes to block 318.

In block 318, the position index is incremented by 1.

In block 320, it is determined whether the sum of the position index and the current subsequence length exceeds the length of the overall symbol sequence in terms of symbols. If the sum exceeds the length of the overall symbol sequence, then the end of the overall symbol sequence has been reached, and control passes to block 321. Otherwise, control passes back to block 308.

In block 321, each symbol that occurs only once in the overall symbol sequence, and each symbol that was "crossed out" in block 309, is removed from the overall symbol sequence. Control passes to block 322.

In block 322, the current subsequence length is incremented by 1.

In block 326, it is determined whether the current subsequence length is greater than half of the length of the overall symbol sequence, and whether the overall symbol sequence is empty. If the current subsequence length is greater than half of the overall symbol sequence length, or if the overall symbol sequence is empty, then control passes to block 328. Otherwise, control passes back to block 304, and pattern identifier 114 begins to look for repetitions of slightly larger subsequences.

In block 328, the fuzzy pattern identification technique is completed. The subsequences contained in the repeating pattern list are candidates for a representative set of characteristics for a particular category. An example technique for selecting one of the subsequences to be the representative set of characteristics for the particular category is described further below.

An example of the application of the foregoing fuzzy pattern identification technique follows. If the overall symbol sequence initially comprises "B, B, B, D, B, D, A, T, Z, B, B, D, A, X, X, B, D, A," then the first pass of the technique removes singly occurring symbols "T" and "Z," and replaces all consecutive multiple occurrences of one-symbol subsequences "B" and "X" with single occurrences of those subsequences. The resulting overall symbol sequence then comprises "B, D, B, D, A, B, D, A, X, B, D, A." Subsequences "B" and "X" are added to the repeating pattern list.

The second pass of the technique removes singly occurring symbol "X" and replaces all consecutive multiple occurrences of two-symbol subsequence "B, D" with a single occurrence of that subsequence. The resulting overall symbol sequence then comprises "B, D, A, B, D, A, B, D, A." Subsequence "B, D" is added to the repeating pattern list.

The third pass of the technique does not remove any singly occurring symbols, because there are none, and replaces all consecutive multiple occurrences of three-symbol subsequence "B, D, A" within a single occurrence of that subsequence. The resulting overall symbol sequence then comprises "B, D, A." Subsequence "B, D, A" is added to the repeating pattern list.

At this point the technique has identified all of the possible repeating patterns in the original overall symbol sequence. The subsequences in the repeating pattern list are "B," "X," "B, D," and "B, D, A." One of these candidate patterns may be selected as a representative set of characteristics for a particular category of data item for a particular web site.

Characteristic Code Selector

Above is an example that shows how repeated patterns can be discovered for a given overall symbol sequence. However, an overall symbol sequence usually contains a large number of repeating patterns, not all of which accurately represent a set of category characteristics for a particular category. Therefore, according to one embodiment of the invention, characteristic code selector 116 chooses one of the "mined" subsequences to represent the set of category characteristics for the category at issue.

According to one embodiment of the invention, characteristic code selector 116 selects a subsequence based on a number of criteria, including repeat frequency, subsequence length, regularity, and document coverage. Some or all of these criteria may be used in combination in evaluating whether a candidate subsequence is the "best" subsequence for identifying data items of a particular category for a particular web site. In one embodiment of the invention, each of the criteria is associated with a threshold that can either have a default value, or can be specified by a user.

In one embodiment of the invention, for each subsequence identified by pattern identifier 114, the following factors are considered when selecting from among the subsequences: frequency, which is the number of times a subsequence repeats in the original symbol sequence (i.e., before any replacement or removal is performed); length, which is the length of the subsequence in symbols; and coverage, which is a measure of the extent to which the data items that correspond to the subsequence comprise the total contents of the documents from which the data items were excerpted.

Figure 4:
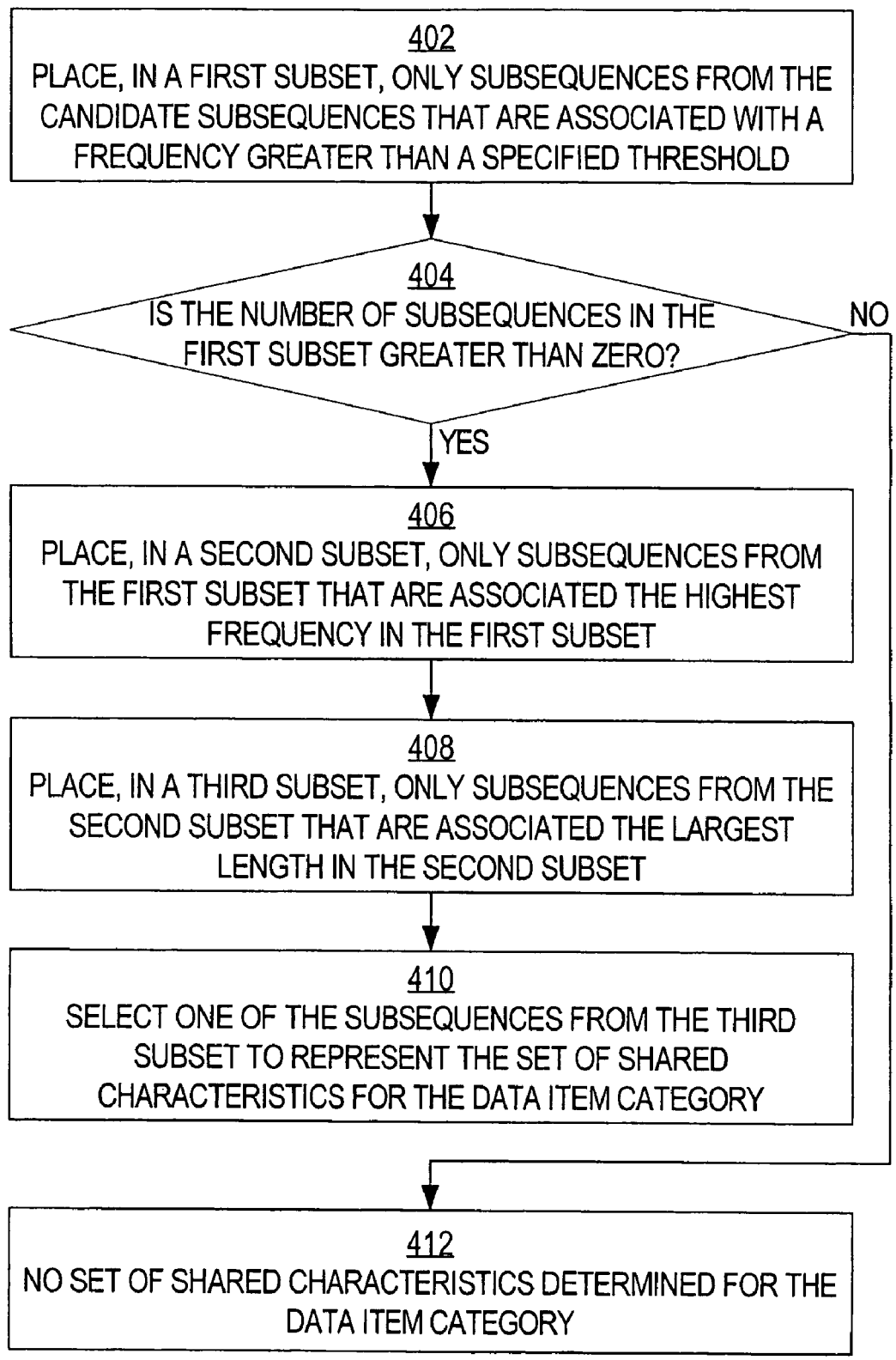
FIG. 4 is a flow diagram illustrating a technique for selecting, from among a plurality of candidate symbol subsequences, a symbol subsequence that represents a set of shared characteristics for a particular data item category and web site, according to an embodiment of the invention.

FIG. 4 is a flow diagram illustrating a technique for selecting, from among a plurality of candidate symbol subsequences, a symbol subsequence that represents a set of category characteristics for a particular data item category and web site, according to an embodiment of the invention. For example, characteristic code selector 116 may perform such a technique.

In block 402, from among all of the candidate subsequences determined for a particular data item category and web site, only the candidate subsequences that are associated with a frequency greater than a specified threshold are selected and placed in a first subset.

In block 404, it is determined whether the number of candidate subsequences in the first subset is greater than zero. If the number of candidate subsequences in the first subset is greater than zero, then control passes to block 406. Otherwise, control passes to block 412.

In block 406, from among all of the candidate subsequences in the first subset, only the candidate subsequences that are associated with the highest frequency among frequencies associated with candidate subsequences in the first subset are selected and placed in a second subset.

In block 408, from among all of the candidate subsequences in the second subset, only the candidate subsequences that are associated with the largest length among lengths associated with candidate subsequences in the second subset are selected and placed in a third subset.

In block 410, one of the candidate subsequences in the third subset is selected to represent the shared set of characteristics for the particular data item category and web site. As is discussed above, the shared set of characteristics may be used to identify, on each of the particular web site's pages, a candidate data item that actually fits the particular data item category.

Alternatively, in block 412, no set of category characteristics is determined for the particular data item category for the particular web site. Nevertheless, this does not preclude sets of category characteristics from being determined for other data item categories or other web sites.

Hardware Overview

Figure 5:
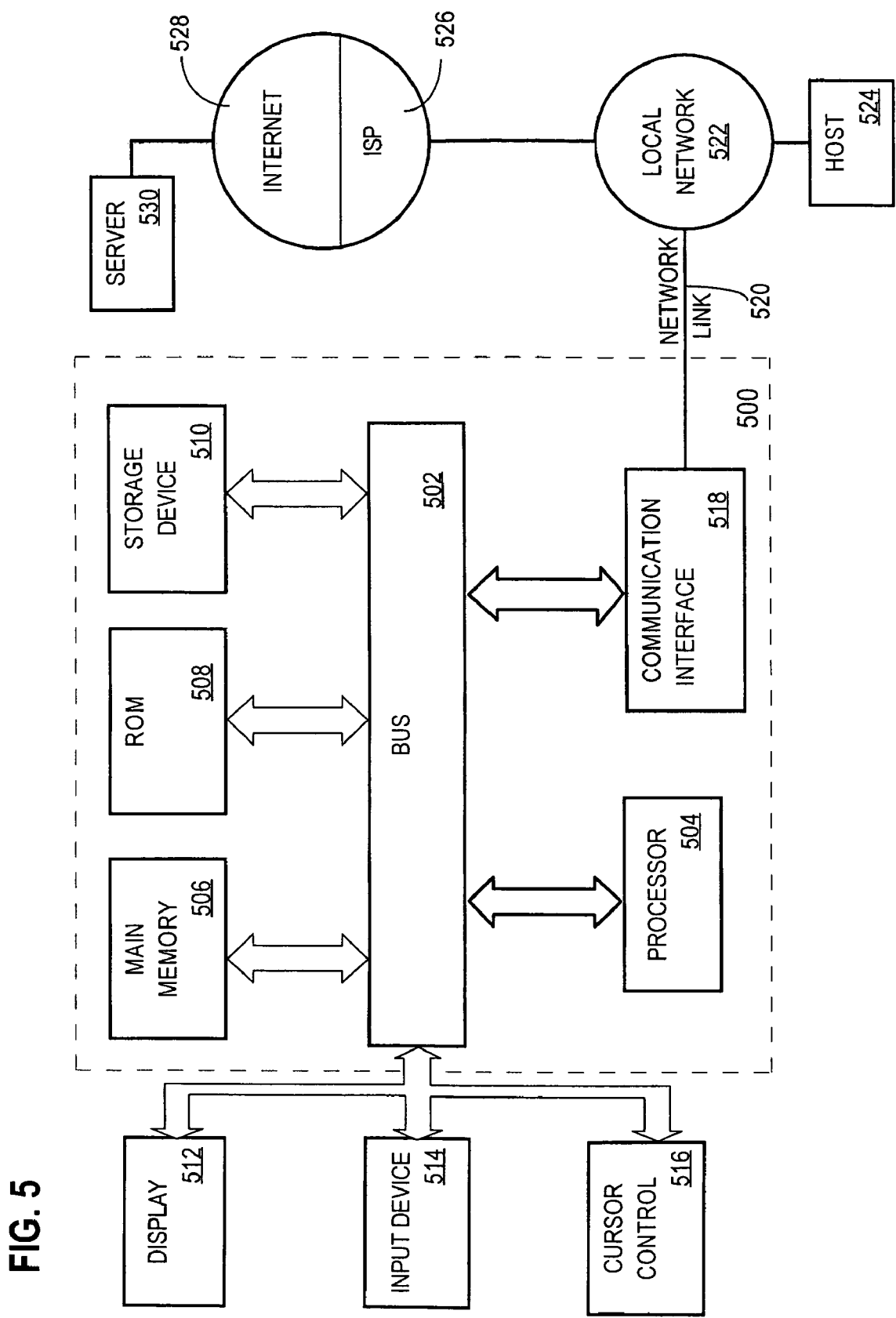
FIG. 5 is a block diagram of a computer system on which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of maintaining a search index, the method comprising:
   given a particular index that contains a plurality of entries, in which each entry of the plurality of entries identifies (a) a separate document from a first plurality of documents, (b) at least one data item that was excerpted from the document, (c) at least one category to which the at least one data item was deemed to belong, and (d) a measure of confidence that the at least one data item was correctly categorized as belonging to the at least one category:
   identifying, in two or more entries of the particular index, two or more particular data items that (a) are each associated, in the index, with a particular category, and (b) are each associated, in the index, with a measure of confidence of correct categorization that is at least as high as a specified confidence threshold;
   identifying one or more characteristics other than the particular category that are shared by each of the two or more particular data items;
   selecting, from the one or more characteristics, one or more particular characteristics; and
   for each particular document in a second plurality of documents, performing steps comprising:
      determining whether a candidate data item excerpted from the particular document has each of the one or more particular characteristics; and
      in response to a determination that the candidate data item has each of the one or more particular characteristics, inserting, into the particular index, an entry that identifies (a) the candidate data item and (b) the particular category, thereby indicating that the candidate data item belongs to the particular category.

2. The method of claim 1, wherein the second plurality of documents comprises the first plurality of documents.

3. A volatile or non-volatile computer-readable storage medium carrying one or more sequences of instructions which, when executed by one or more processors, causes the one or more processors to perform the method recited in claim 2.

4. The method of claim 1, wherein inserting the entry into the particular index comprises replacing, with the candidate data item, a different data item that was previously associated with the particular category.

5. A volatile or non-volatile computer-readable storage medium carrying one or more sequences of instructions which, when executed by one or more processors, causes the one or more processors to perform the method recited in claim 4.

6. The method of claim 1, wherein selecting the one or more particular characteristics comprises selecting, from among different sets of characteristics that are shared by each of the two or more particular data items, a set of one or more characteristics that is associated most often with the two or more particular data items.

7. A volatile or non-volatile computer-readable storage medium carrying one or more sequences of instructions which, when executed by one or more processors, causes the one or more processors to perform the method recited in claim 6.

8. The method of claim 1, wherein the first plurality of documents and the second plurality of documents only comprise web pages that are accessible through the same web site, and wherein each of the two or more particular data items was extracted from a different web page of the web pages that are accessible through the web site.

9. A volatile or non-volatile computer-readable storage medium carrying one or more sequences of instructions which, when executed by one or more processors, causes the one or more processors to perform the method recited in claim 8.

10. A volatile or non-volatile computer-readable storage medium carrying one or more sequences of instructions which, when executed by one or more processors, causes the one or more processors to perform the method recited in claim 1.

11. The method of claim 1, wherein inserting the entry into the particular index comprises replacing, with the particular category, a different category with which the candidate data item was previously associated in the particular index.

12. A volatile or non-volatile computer-readable storage medium carrying one or more sequences of instructions which, when executed by one or more processors, causes the one or more processors to perform the method recited in claim 11.

13. The method of claim 1, wherein the step of determining whether the candidate data item excerpted from the particular document has each of the one or more particular characteristics comprises determining whether a measure of confidence that the candidate data item is already associated, in the particular index, with a correct category is less than the specified confidence threshold.

14. A volatile or non-volatile computer-readable storage medium carrying one or more sequences of instructions which, when executed by one or more processors, causes the one or more processors to perform the method recited in claim 13.

15. The method of claim 1, wherein the step of identifying one or more characteristics that are shared by each of the two or more particular data items comprises identifying a shared set of tags that enclose each of the two or more particular data items within the documents from which the two or more particular data items were excerpted.

16. A volatile or non-volatile computer-readable storage medium carrying one or more sequences of instructions which, when executed by one or more processors, causes the one or more processors to perform the method recited in claim 15.

* * * * *

UNITED STATES PATENT AND TRADEMARK OFFICE
CERTIFICATE OF CORRECTION

PATENT NO.        : 7,483,903 B2
APPLICATION NO.   : 11/253023
DATED             : January 27, 2009
INVENTOR(S)       : Kulkarni et al.

It is certified that error appears in the above-identified patent and that said Letters Patent is hereby corrected as shown below:

On the title page
Insert   --Foreign Application Priority Data
     August 17, 2005    (IN)              753/KOL/05--

Page 2 under item (56),
OTHER PUBLICATIONS:
Column 2, Line 16, delete "&20from%20Labeled%20" and insert
--%20from%20Labeled%20--

Signed and Sealed this

Thirteenth Day of October, 2009

David J. Kappos
*Director of the United States Patent and Trademark Office*